Sept. 4, 1951 J. P. HEIL 2,566,724
COMBINATION LAWN MOWER AND SNOW PLOW
Filed April 30, 1947 6 Sheets-Sheet 1
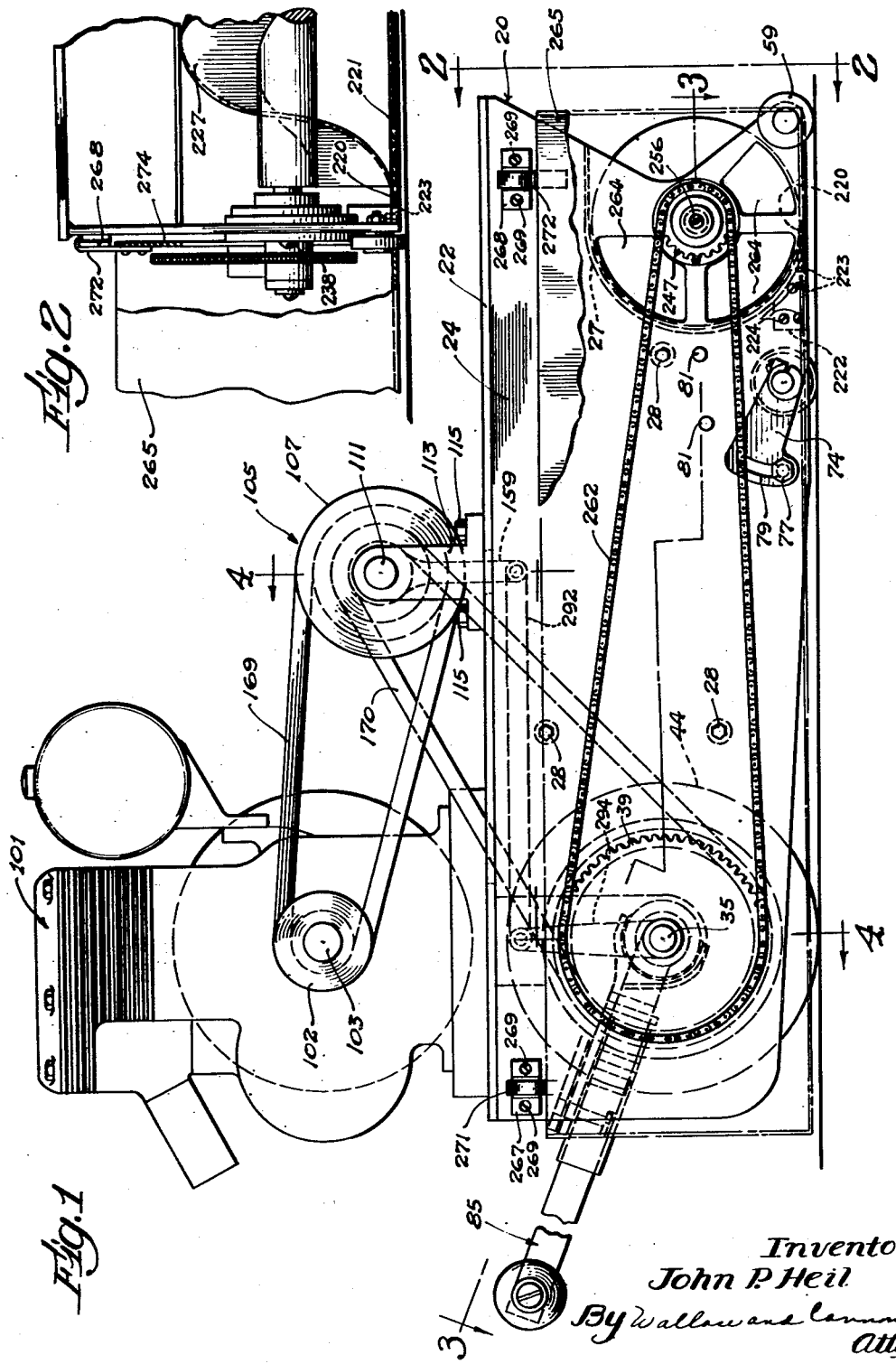
Inventor:
John P. Heil
By Wallace and Lennon
Attys Sept. 4, 1951   J. P. HEIL   2,566,724
COMBINATION LAWN MOWER AND SNOW PLOW
Filed April 30, 1947   6 Sheets-Sheet 2
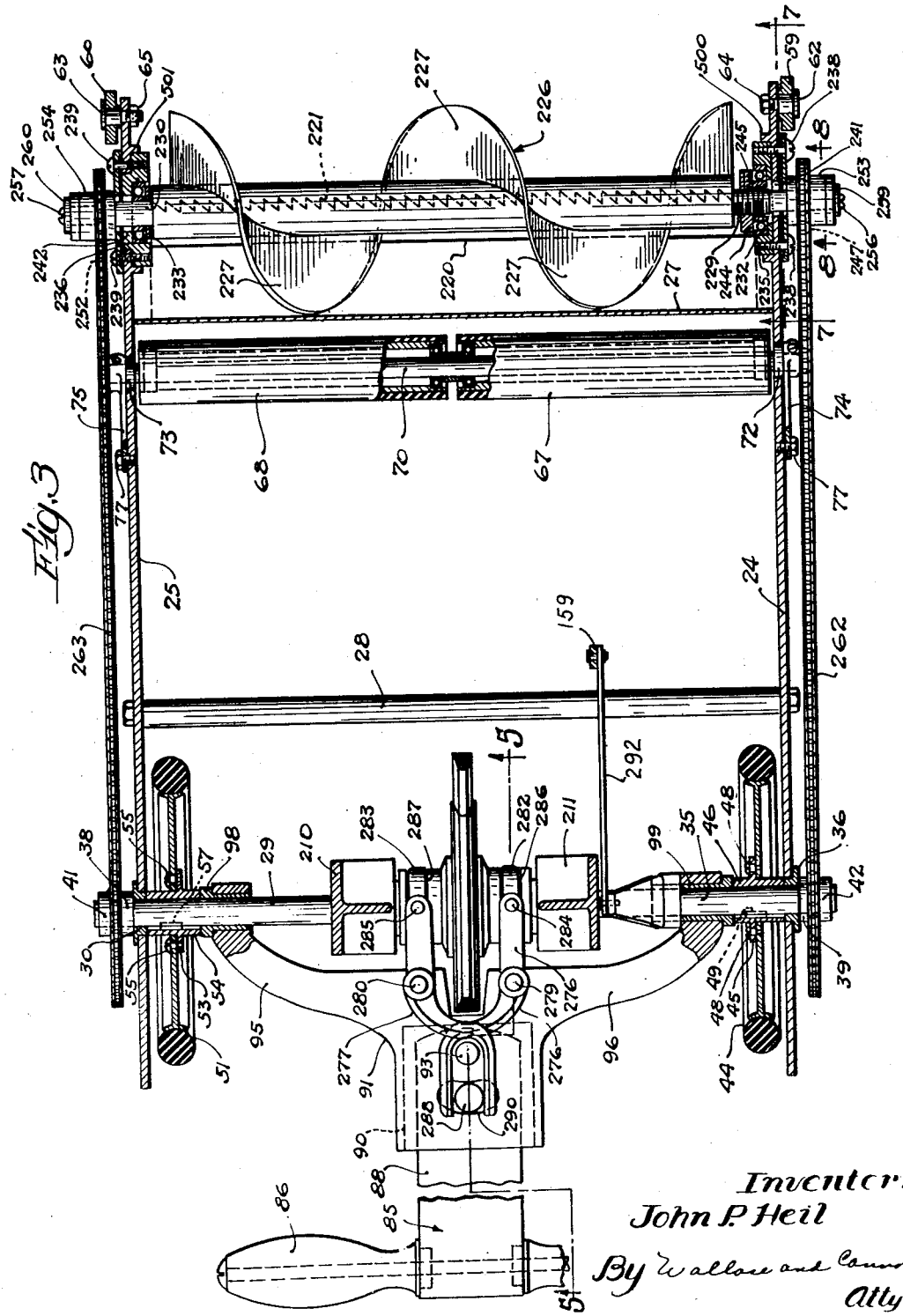
Inventor:
John P. Heil
By Wallace and Cannon
Attys Sept. 4, 1951            J. P. HEIL            2,566,724
COMBINATION LAWN MOWER AND SNOW PLOW
Filed April 30, 1947            6 Sheets-Sheet 3
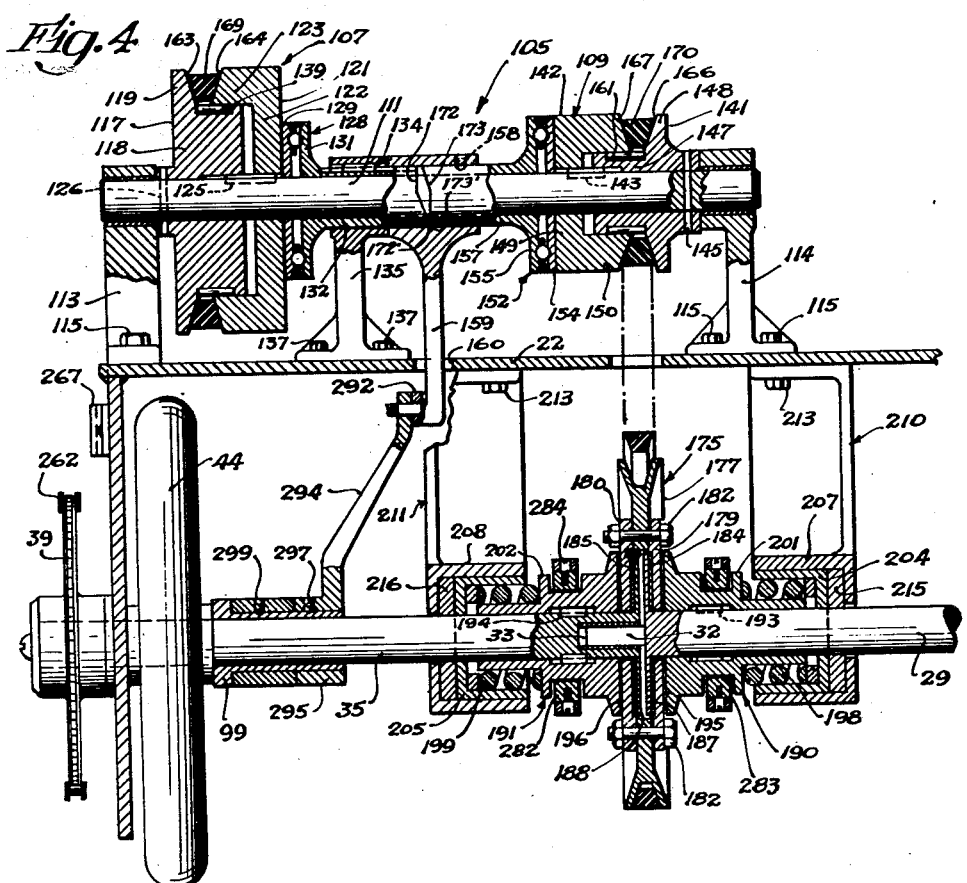
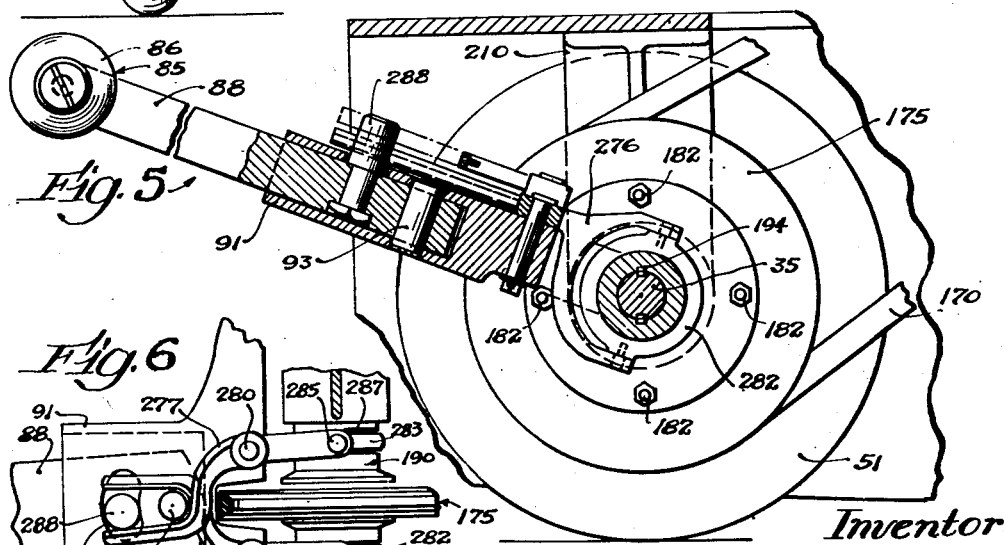
Inventor:
John P. Heil

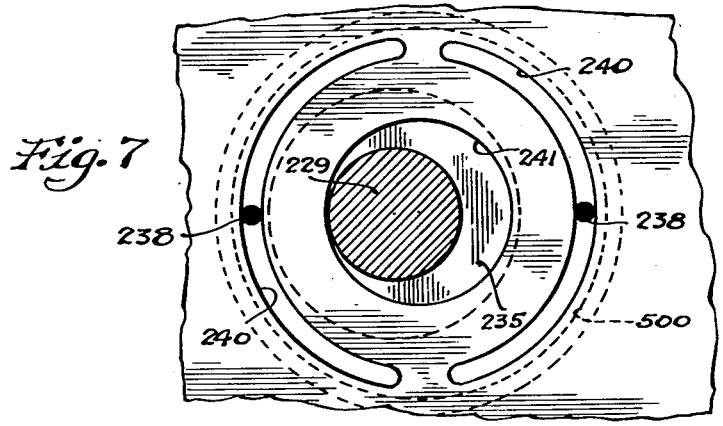
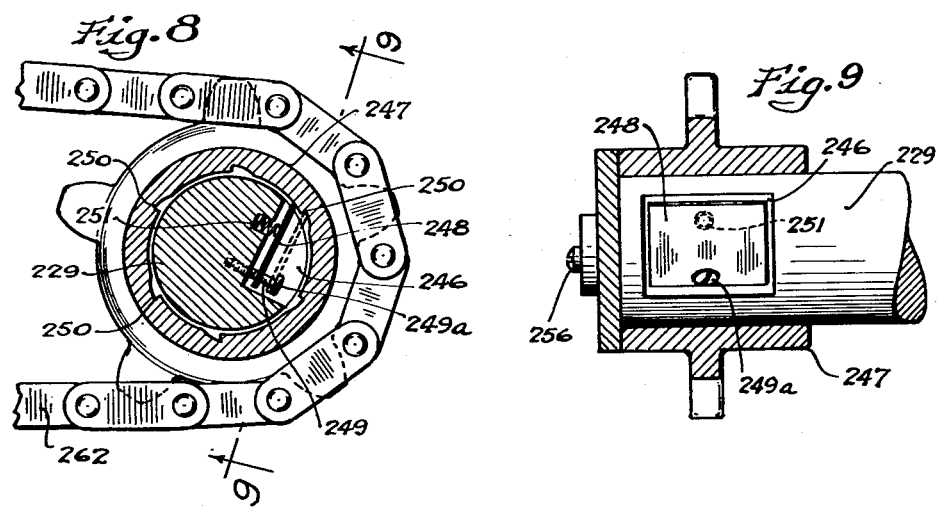
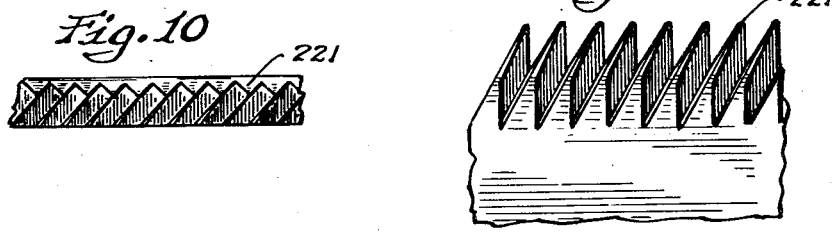

Sept. 4, 1951 J. P. HEIL 2,566,724
COMBINATION LAWN MOWER AND SNOW PLOW
Filed April 30, 1947 6 Sheets-Sheet 5
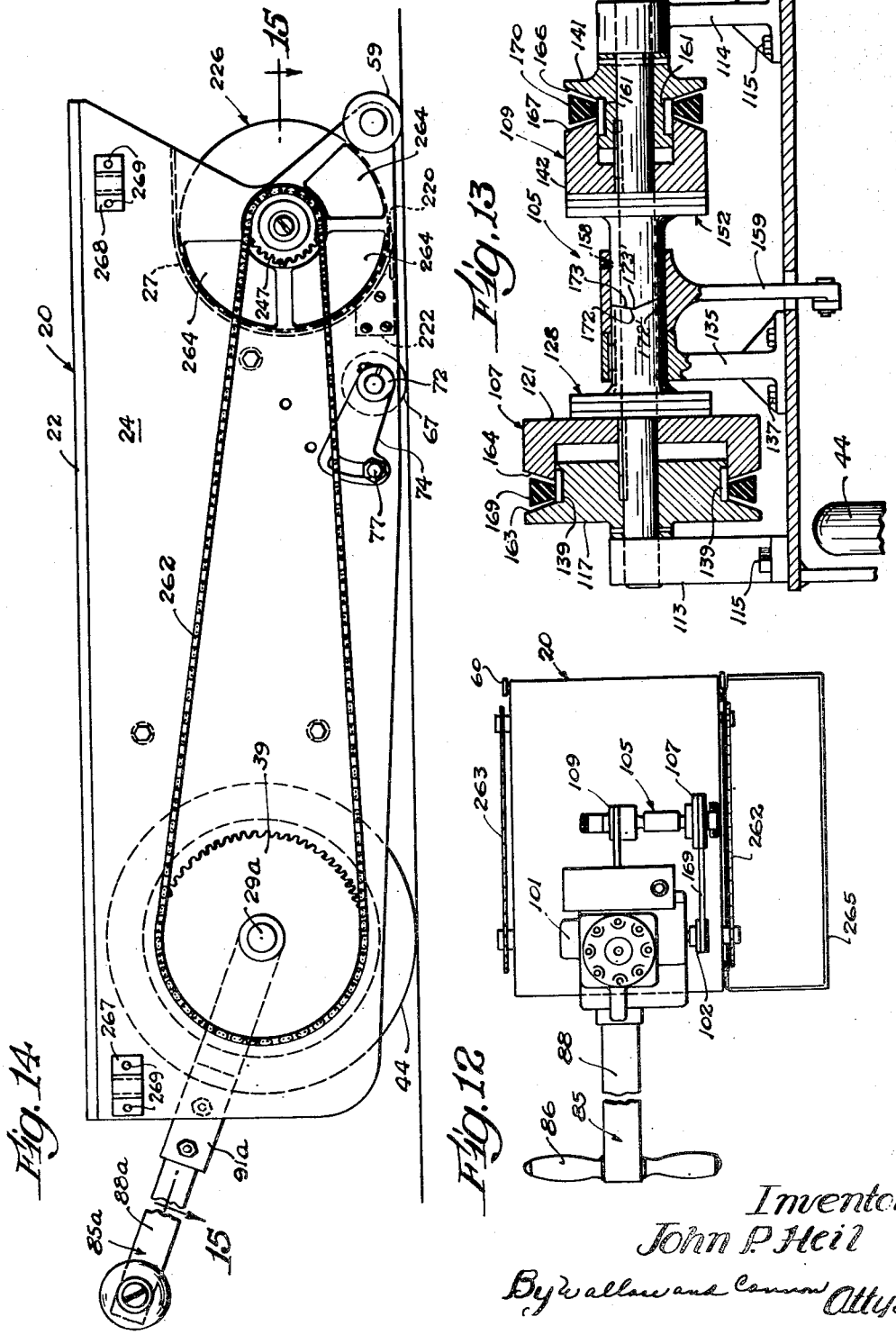
Inventor:
John P. Heil
By Wallace and Cannon Attys.

Sept. 4, 1951 J. P. HEIL 2,566,724
COMBINATION LAWN MOWER AND SNOW PLOW
Filed April 30, 1947 6 Sheets-Sheet 6
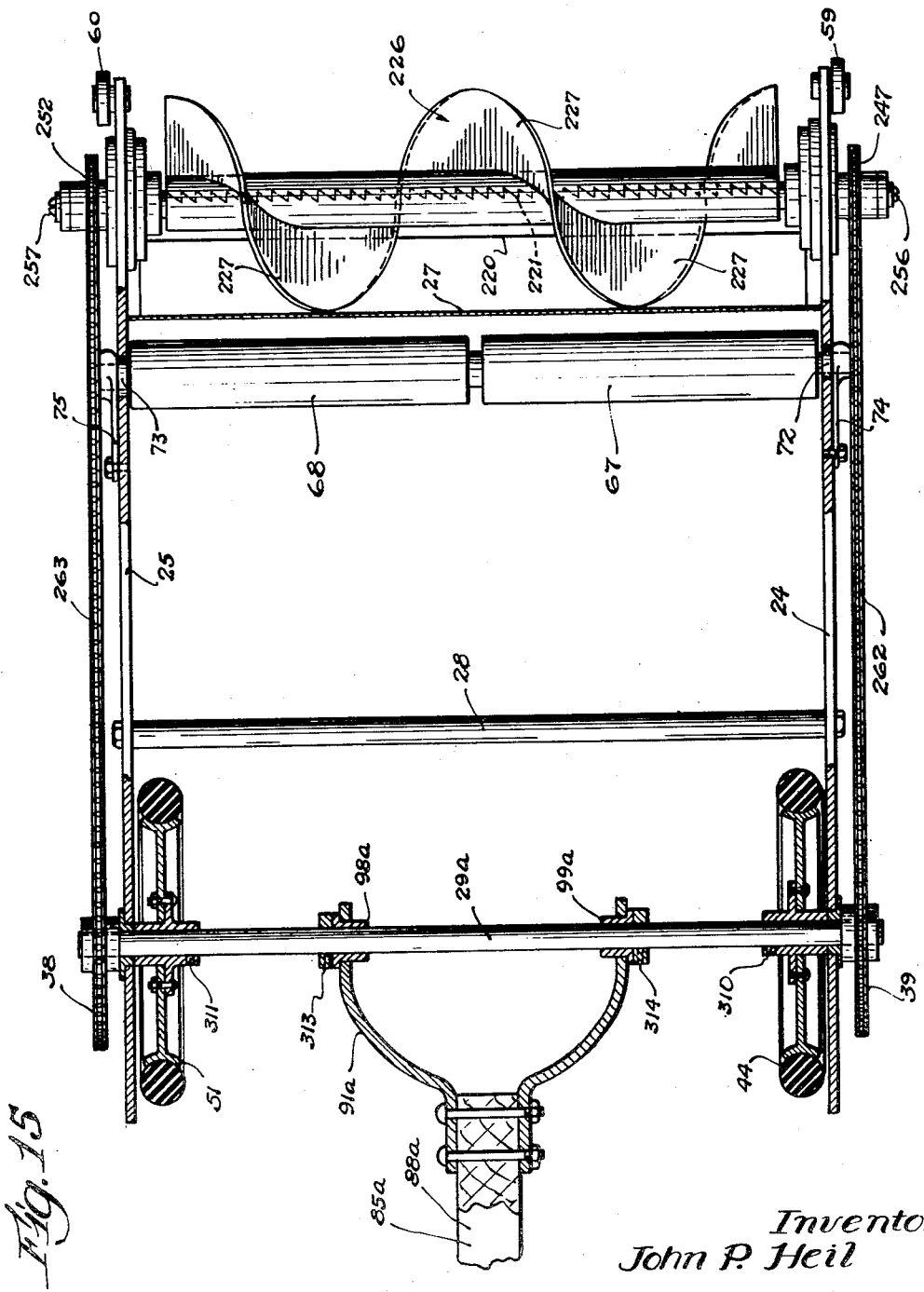
Inventor:
John P. Heil
By Wallace and Cannon Attys Patented Sept. 4, 1951

2,566,724

UNITED STATES PATENT OFFICE 2,566,724

COMBINATION LAWN MOWER AND SNOWPLOW

John P. Heil, Melrose Park, Ill.

Application April 30, 1947, Serial No. 744,837

15 Claims. (Cl. 56—26)

1

This invention relates to machines for maintaining yards and more particularly to a combination lawn mower and snow plow.

Several types of lawn mowers have been heretofore known to the art as have several different types of snow plows. However, as far as I have been advised, no combination lawn mowers and snow plows of the character with which my invention is concerned have been heretofore known to the art, and it is a primary object of my invention to afford a novel combination snow plow and lawn mower which is practical and which is efficient in operation when used either as a snow plow or as a lawn mower.

An object ancillary to the foregoing is to construct a combination snow plow and lawn mower which may be economically produced commercially and is a device which is practical for the ordinary home owner to use in the maintenance of his property.

A further object of my invention is to drive a combination snow plow and lawn mower in a novel and efficient manner, and an object ancillary to this is to so arrange the elements of my novel device that when my device is guided around corners in the normal manner the drive of the device is automatically altered to allow for the different radii around which the various elements of my device are moving.

More specifically it is an object of my invention to construct a combination snow plow and lawn mower wherein the plowing and mowing mechanisms are driven by a suitable power source, and which may be transported on wheels, or the like, which are power driven, and wherein the action of guiding the device around corners in the normal manner automatically disconnects the wheel, or the like, on the inside of the turn, from the power source and permits it to roll freely so that a smooth turn may be made without slipping and sliding of the wheels, or the like.

Another object is to control the direction of the discharge of either snow or grass from my device.

A further object of my invention is to construct a combination snow plow and lawn mower in such a manner that a suitable container may readily be associated therewith in a novel manner to efficiently catch either snow or grass discharged therefrom.

Yet another object is to construct my novel device in such a manner that the proximity of the mowing or plowing operations performed therewith with respect to the surface over which the device is operating may be readily adjusted by the operator.

Another object of my invention is to associate a clutch mechanism with the power source of my device in such a manner that the power source may be readily disconnected from operative driving relation to the device in a novel manner.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view, with certain parts broken away, of a machine embodying the principles of my invention;

Fig. 2 is a detail view taken substantially on the line 2—2 in Fig. 1;

Fig. 3 is a sectional view showing certain parts broken away to expose the interior thereof taken substantially on the line 3—3 in Fig. 1;

Fig. 4 is a sectional view taken substantially on the line 4—4 in Fig. 1;

Fig. 5 is a detail sectional view on an enlarged scale and being taken substantially on the line 5—5 in Fig. 3;

Fig. 6 is a detail view somewhat similar to Fig. 3 but showing the handle of my machine in a different position;

Fig. 7 is a detail sectional view taken substantially along the line 7—7 in Fig. 3;

Fig. 8 is a detail sectional view taken substantially along the line 8—8 in Fig. 3;

Fig. 9 is a detail sectional view taken substantially along the line 9—9 in Fig. 8;

Fig. 10 is an enlarged front elevational detail view of the cutter bar shown in Fig. 2;

Fig. 11 is an enlarged bottom plan detail view of a portion of the cutter bar shown in Fig. 10;

Fig. 12 is a top plan view on a reduced scale of the machine shown in Fig. 1;

Fig. 13 is a detail view similar to Fig. 4 but showing the master clutch of my machine in a different position of adjustment and showing certain members broken away to expose the interior thereof;

Fig. 14 is a side elevational view of a modified form of my machine; and

Fig. 15 is a sectional view taken substantially along the line 15—15 in Fig. 14.

The preferred form of my invention shown in the accompanying drawings embodies a supporting frame 20 having a top wall 22, two side walls 24 and 25, and an inwardly curved front wall 27. The two side walls 24 and 25 are secured together by suitable stay-bolts or bracing members 28, to impart the desired rigidity thereto.

A shaft 29, having its outer end portion journaled in a bushing 30 in the side wall 25, has a stud 32, Fig. 4, projecting from the inner end portion thereof into an opening 33 formed in the inner end portion of a shaft 35 which has its outer end portion journaled in a bushing 36 in the other side wall 24 of the supporting frame 20. Two sprocket wheels 38 and 39 are mounted on the shafts 29 and 35, respectively, for rotation therewith, outside of the supporting frame 20, and are held thereon by nuts 41 and 42, respectively, the sprocket wheels 38 and 39 pressing against the bushings 30 and 36, respectively, and holding them in position in the side walls 25 and 24.

A wheel 44, secured to a collar 45 on a sleeve 46 by screws 48 is mounted on the shaft 35 for rotation therewith, the sleeve 46 being attached to the shaft 35 by a key 49. A similar wheel 51, secured to a collar 53 on a sleeve 54 by screws 55 is mounted on the shaft 29 for rotation therewith, the sleeve 54 being attached to the shaft 29 by a key 57. The wheels 44 and 51 are of sufficient diameter that they project below the frame 20 and support the latter in spaced relation to the ground or other supporting surface on which my machine is standing.

The front end portion of the supporting frame 20 is mounted on two wheels 59 and 60 which are rotatably mounted on studs 62 and 63 mounted in the front end portion of the side walls 24 and 25, respectively, and secured therein by nuts 64 and 65. Two rollers 67 and 68, which form an additional support for the front end portion of my machine, are journaled on a shaft 70, Figs. 1 and 3, the ends of which are eccentrically mounted in bushings 72 and 73 journaled in the side walls 24 and 25, respectively, of the supporting frame 20. Two arms 74 and 75 project from the bushings 72 and 73, respectively, and form convenient handles by which the bushings may be rotated in the side walls 24 and 25. Any suitable means may be used for holding the bushings 72 and 73 in the positions to which they have been adjusted, the means which I prefer to use and have shown in the accompanying drawings comprising bolts 77 which may be inserted through slots 79 formed in the arms 74 and 75 and screwed into one of a plurality of tapped holes 81 formed in the side walls 24 and 25 respectively.

It will be seen that because of the eccentric mounting of the shaft 70 in the bushings 72 and 73, rotation of the bushings 72 and 73 in the side walls 24 and 25 is effective to raise or lower the shaft 70 with respect to the frame 20 and, therefore, provides a convenient means for raising or lowering the rollers 67 and 68 with respect thereto.

Therefore, from the foregoing, it will be seen that normally my novel machine is supported on and may be transported on the wheels 44, 51, 59 and 60, and the rollers 67 and 68, and under abnormal condition, such as, for example, when the machine is being used on relatively rough ground and it is desired to raise the front end so that it will not bump or scrape on the rough spots, the rollers 67 and 68 may be swung down, by adjusting the supporting arms 74 and 75, so as to lift the front end of the machine further off from the ground.

As is best seen in Figs. 3 and 5, a handle 85 having a hand-grip or handle bar 86 attached to one end portion of a tongue 88, and the other end portion of the tongue pivotally attached in a channel 90 in a yoke 91 by a pin 93, is provided for guiding my machine. The yoke 91 of the handle 85 has two arms 95 and 96 within which are mounted bushings 98 and 99, and the bushings 98 and 99 are journaled on the shafts 29 and 35, respectively, adjacent to the sleeves 54 and 46, and thereby tend to hold the wheels 44 and 51 in proper position on the shafts 35 and 29, respectively, with the sleeves 46 and 54 in engagement with the bushings 36 and 30, respectively.

A suitable source of power such as a gasoline engine 101, Fig. 1, is mounted on the top wall 22 of the supporting frame 20 and has a suitable drive pulley, such as a V-pulley 102 secured to the drive shaft 103 thereof, and furnishes the power to drive my novel machine as will be presently described.

A master clutch 105, Figs. 4, 12 and 13, is provided in my machine for controlling the driving operation of the motor 101. This master clutch 105 includes a driving V-pulley 107 and a driven V-pulley 109 mounted on a shaft 111 which has its ends journaled in two supporting members 113 and 114 attached to the top wall 22 of the supporting frame 20 by any suitable means such as bolts 115.

The driving V-pulley 107 comprises a side member 117, having a hub 118 with a collar 119 projecting therefrom, and a side member 121 having an end plate 122 with a peripheral flange 123 projecting therefrom. Both the side members 117 and 121 are keyed to the shaft 111 by a key 125, and the side member 117 is, in addition, pinned against longitudinal movement on the shaft 111 by a pin 126, the side member 121 being slidable longitudinally of the shaft for a purpose to be presently explained. A ball bearing 128 having one race 129 attached to the end plate 122 of the side member 121 of the V-pulley 107, for rotation therewith, is mounted in the shaft 111 and the other race 131 thereof terminates on a sleeve 132 which is held against rotation by a key 134 in a supporting member 135 through which the shaft 111 extends and which is secured to the top wall 22 of the supporting frame 20 by bolts 137. A plurality of roller bearings 139 are journaled in the peripheral edge portion of the hub 118 of the driving V-pulley 107 for a purpose which will be described hereinafter.

The driven pulley 109 is similar in construction to the driving pulley 107 and comprises two side members 141 and 142 keyed to the shaft 111 for rotation therewith, by a key 143, the side member 141 being also held against longitudinal movement on the shaft 111 by a pin 145, and the other side member 142 being movable longitudinally of the shaft 111. The side member 141, like the side member 117, comprises a hub 147 with a collar 148 projecting therefrom, and, like the side member 121, the side member 142 comprises an end plate 149 having a peripheral flange 150 projecting therefrom. A ball bearing 152, similar to the ball bearing 128, having one race 154 attached to the side member 142, for rotation therewith, is journaled on the shaft 111 and the other race 155 thereof terminates in a sleeve 157 which is also journaled on the shaft 111. The sleeve 157 extends through a lever 159 which extends through a slot 160 formed in the top wall 22 of the supporting frame 20, and is secured thereto for limited rotational movement therewith by a pin or screw 158 which extends into a suitable slot in the sleeve 157 so that the sleeve 157 is free to move longitudinally through the lever 159 to a limited extent. A plurality of roller bearings 161, like the rollers 139, are journaled in the peripheral edge portion of the hub 147 of the side member 141.

The adjacent faces 163 and 164 of the collar 119 and the flange 123, respectively, of the driving V-pulley 107 are tapered inwardly toward each other, as are the adjacent faces 166 and 167 of the collar 148 and the flange 150 of the driven V-pulley 109, and these side faces of the respective pulleys 107 and 109 form the channels within which suitable V-belts 169 and 170, respectively, run during operation of my machine, as will be presently described.

As is best seen in Figs. 4 and 13, the inner end portions of the sleeves 132 and 157 on the ball-bearings 128 and 152, respectively, are shaped to form cams 172 and 173, respectively, which cooperate to adjust the longitudinal position of the ball bearings 128 and 152 and, therefore, the side members 121 and 142 of the V-pulleys 107 and 109, respectively, on the shaft 111. Thus it will be seen that when, as shown in Fig. 4, the raised portions 172' and 173' of the cams 172 and 173 are in engagement with each other the side members 121 and 142 of the V-pulleys 107 and 109, respectively, are cammed outwardly so that the belts 169 and 170 are wedged firmly between the faces 163—164 and 166—167 of the pulleys 107 and 109, respectively, and are in good driving engagement with these pulleys; and when, as shown in Fig. 13, the sleeve 157 on the ball-bearing 152 is turned so that the raised portions of the cam 173 thereon engage the complementary indented portions of the cam 172, the side members 121 and 142 of the V-pulleys 107 and 109, respectively, are free to slide inwardly to a limited extent on the shaft 111 so that the V-belts 169 and 170 ride loosely in the rims of the pulleys 107 and 109, respectively, in engagement with the roller-bearings 139 and 161 thereon and are not effective to drive these pulleys. Rotation of the sleeve 157, to move the cam 173 relative to the cam 172 and thereby engage and disengage the clutch 105 is effected by moving the lever 159, which is connected by suitable linkage to the handle 85 of my machine as will be presently described.

The V-belt 170 operably connects the V-pulley 109 to a V-pulley 175 journaled on the ends of the shafts 29 and 35. The V-pulley 175 has a rim member 177 to which two side plates 179 and 180 are attached by a plurality of bolts 182, Fig. 4. Two wear plates 184 and 185 are positioned in pockets formed in the inner faces of the side plates 179 and 180 and engage flanges 187 and 188 formed on the shafts 29 and 35, respectively. The flanges 187 and 188 hold the V-pulley 175 against any substantial axial movement on the shafts 29 and 35.

Driving connection between the V-pulley 175 and the shafts 29 and 35 is effected by two clutch elements 190 and 191 which are keyed to the shafts 29 and 35, respectively, by keys 193 and 194, respectively, and the respective faces 195, 196 of the clutch elements 190 and 191 being normally held in tight frictional engagement with the outer faces of the side plates 179 and 180 of the V-pulley 175 by relatively stiff compression springs 198 and 199. The compression springs 198 and 199 are positioned between collars 201 and 202 on the clutch elements 190 and 191, respectively, and two cup-shaped members 204 and 205 which are mounted in housings 207 and 208 formed in the lower end portions of supporting brackets 210 and 211, respectively, which are attached to the top wall 22 of the supporting frame 22 by suitable fastening means such as bolts 213 and depend therefrom. Wear plates 215 and 216 are positioned between the ends of the cup-shaped members 204 and 205 and the ends of the housings 207 and 208.

Therefore, from the foregoing it will be seen that during normal operation of my novel machine, power is supplied from the drive shaft 103 thereon through the pulley 102 and the V-belt 169 to the drive pulley 107 of the master clutch 105. The master clutch 105 being in the "engaged" position at that time, as shown in Fig. 4, with the cams 172 and 173 holding the side plates 121 and 142 of the V-pulleys outwardly into relatively tight frictional engagement with the V-belts 169 and 170, power is thus supplied from the V-pulley 107 through the shaft 111 to the V-pulley 109, and from the V-pulley 109 through the V-belt 170 to the V-pulley 175 to thereby cause the V-pulley 175 to be rotated. Rotation of the V-pulley 175 causes the clutch elements 190 and 191 to be rotated and thereby rotates the shafts 29 and 35, the wheels 44 and 51 and the sprocket wheels 38 and 39. The rotation of the wheels 44 and 51 is, of course, effective to cause my machine to be driven forwardly over the surface on which it is sitting and the rotation of the sprocket wheels 38 and 39 is effective to drive certain mowing and plowing mechanism in my machine as will be presently described.

A pick-up member or cutter bar 220, Figs. 1, 2 and 3, having teeth 221 formed on the front edge portion thereof is attached at each end to suitable brackets 222 by screws 223, and the brackets 222 are secured to the front end portions of the side walls 24 and 25 of the supporting frame 20 by screws 224 in such a manner that the cutter bar 220 is supported thereby in substantially parallel relation to the supporting surface upon which my machine rests. A rotary blade element 226, having relatively wide helical-shaped blades 227, and having two projecting end shafts 229 and 230 is mounted between the side walls 24 and 25 of the supporting frame 20, within the concavity formed by the curved front wall 27 of the supporting frame 20, substantially directly above the cutter bar 220, the teeth 221 of which are complementary to the outline of the blades 227. The shafts 229 and 230 on the ends of the rotary blade element 226 are journaled in ball bearings 232 and 233 eccentrically and rotatably mounted in flanges 500 and 501 projecting inwardly from the side walls 24 and 25, respectively, Figs. 3 and 7. The other end portions of the shafts 229 and 230 project through slots 241 and 242 in the side walls 24 and 25, respectively, and the bushings 235 and 236 are attached to the side walls 24 and 25 by screws 238 and 239 which extend through slots 240 formed in the side walls 24 and 25. A collar 244 is threaded onto the shaft 229 into position to properly space the rotary blade element 226 between the side walls 24 and 25 and is secured in such position by suitable fastening means such as a screw 245.

From the foregoing it will be apparent that the shafts 229 and 230 may be readily raised and lowered in the enlarged holes 241 and 242 in the side walls 24 and 25, to thereby raise and lower the rotary blade 226 relative to the cutter bar 220, by loosening the screws 238 and 239, rotating the bushings 235 and 236 in the proper direction in the flanges 500 and 501, respectively, and then tightening the screws 238 and 239 again to hold the bushings 235 and 236, and, therefore, the shafts 229 and 230 in the newly adjusted position.

A sprocket wheel 247, having a plurality of teeth 250 formed on the interior thereof, is journaled on the outer end portion of the shaft 229. The shaft 229 has a recess 246 formed in the periphery thereof in which a plate 248 is mounted on a pin 249, on which it is free to float. A compression spring 251, mounted in the shaft 229, urges the plate 248 outwardly on the pin 249, the pin 249 having a head 249a formed on its outer extremity for limiting the outward movement of the plate 248.

The plate 248 is of such size and configuration that when it occupies the position shown in solid lines in Fig. 8, in which position it is fully retracted against the spring 251, the outer edge portion thereof is substantially flush with the peripheral surface of the shaft 229. However, when the plate 248 is in the extended position, indicated in broken lines in Fig. 8, the outer edge portion thereof protrudes beyond the periphery of the shaft 229 and is operable to engage the teeth 250 in the sprocket wheel 247. Thus it will be seen that when the sprocket wheel 247 rotates in a forward or, in other words, clockwise direction as viewed in Fig. 8, the plate 248 is carried by wheel 247 and the urging of the spring 251 into the forward position, shown in broken lines in Fig. 8, where it engages the teeth 250 and thereby establishes a driving connection between the sprocket wheel 247 and the shaft 229. On the other hand, when the sprocket wheel 247 is rotated in a reverse direction, that is, in a counterclockwise direction as viewed in Fig. 8, the plate 248 is pressed inwardly thereby against the urging of the spring 251 into the position shown in solid lines in Fig. 8, in which position the outer edge of the plate is substantially flush with the peripheral surface of the shaft 229 and the sprocket wheel 247 is free to rotate thereover without establishing a driving connection with the shaft 229. Therefore, it will be seen, my novel mechanism provides a one-way drive connection between the sprocket wheel 247 and the blade 226.

Another sprocket wheel 252, similar to the sprocket wheel 247, is journaled on the outer end portion of the shaft 230 of the rotary blade element 226 and is connected thereto by a plate-and-tooth connection (not shown) which is similar to that for the wheel 247 and the shaft 229, shown in detail in Figs. 8 and 9, so that a one-way drive connection is established between the sprocket wheel 252 and the shaft 230 which corresponds to the drive connection between the sprocket wheel 247 and the shaft 229.

The sprocket wheels 247 and 250 have outwardly projecting hubs 253 and 254 thereon, respectively, and are held on the shafts 229 and 230 by screws 256 and 257 which project through washers 259 and 260 and are screwed into the outer end portions of the shafts 229 and 230, respectively.

The sprocket wheels 247 and 252 are connected to the sprocket wheels 39 and 38, respectively, by chains 262 and 263, so that, therefore, when the shafts 35 and 29 are driven by the engine 101, as previously described, the sprocket wheels 247 and 250 are rotated and thereby drive the rotary blade element 226. The ratio of the diameters of the sprocket wheels 39 and 38 to the diameters of the sprocket wheels 247 and 252, respectively, is preferably great enough so that the rotary blade element 226 makes several revolutions to each revolution of the sprocket wheels 39 and 38, and the supporting wheels 44 and 51.

The side wall 24 of the supporting frame 20 has openings 264 formed therein in alignment with the adjacent end portion of the rotary blade element 226 and the shape of blades 227 of the blade element 226 is such that material picked up thereby when the blade element 226 is rotated in a clockwise direction, as viewed in Fig. 1, will be fed thereby out through the openings 264 in the side wall 24.

From the foregoing it will be apparent that during normal operation of my machine, with the engine 101 running and the master clutch 105 "engaged," the V-pulley 175 is caused to rotate which thereby causes the wheels 44 and 51 to rotate in a clockwise direction, as viewed in Fig. 1, and thereby causes the machine to move forwardly or, in other words, to the right as viewed in Fig. 1, over the surface on which my machine is resting. In addition to rotating the wheels 44 and 51 of my machine, the rotation of the V-pulley 175 causes the sprocket wheels 39 and 38 to be rotated and, thereby, through the chains 262 and 263 drives the sprocket wheels 247 and 252 in a clockwise direction, as viewed in Fig. 1, which causes the rotary blade element to turn as previously described.

When my novel machine is being used on a lawn, or the like, to mow grass, the movement of the machine, as a whole, across the lawn brings the teeth 221 of the cutter bar 220 into engagement with the blades of grass lying in the path of travel thereof, and the rotation of the blade element 226 brings the blades 227 thereof into mowing relation with the cutter bar 220 to thereby cut off the grass. The grass so cut off between the cutter bar 220 and the blades 227 of the blade element 226 is swept back by the blades 227 into the concavity formed by the front wall 27 of the supporting frame 20, from where it is fed by the helical shaped blades 227 outwardly through the openings 264 formed in the side wall 24 of the supporting frame 20.

In a similar manner, when my machine is being used on a sidewalk, or the like, to clear off snow, the machine is driven along the sidewalk with the cutter bar 220 in close proximity thereto and the rotation of the blade element 226 causes the snow to be swept back from the sidewalk into the concavity of the front wall 27 of the supporting frame 20, from where it is fed outwardly through the openings 264 in the side wall 24 by the helical blades 227.

The grass or snow thus discharged through the openings 264 of my machine may be fed onto the ground in a relatively continuous pile or windrow, or they may be caught in a suitable receptacle such as, for example, the carrier 265 shown attached to my machine in Fig. 12. As is best seen in Figs. 1 and 2, suitable hangers 267 and 268 are attached to the outer surface of the side wall 24 by screws 269, into which may be inserted the curved ends of hooks 271 and 272, respectively, attached to the inner side wall 274 of the carrier 265 to thereby support the carrier 265 in proper material-receiving position relative to the openings 264. That portion of the inner side wall 274 of the carrier 265 adjacent to the openings 264 is cut away so that an opening is provided therein through which the material may be fed from the openings 264 into the carrier 265.

When my novel machine is being used to cut grass, and the like, the rotary blade 226 is normally adjusted to such a position, by means of the bushings 235 and 236 as previously discussed, that the blades 227 thereof lightly engage the upper surface of the teeth 221 on the cutter bar 220. As is best seen in Figs. 10 and 11 the teeth 221 are relieved at their bottom portions so that the wear produced by the rotation of the blade 227 over the upper surface of the teeth 221 tends to maintain the blades in sharpened condition. When, on the other hand, my novel machine is being used to plow snow, and the like, the rotary blade 226 may be raised out of engagement with the teeth 221, by properly adjusting the bushings 235 and 236, so that the cutter bar 220 is not subjected to needless wear thereby.

Another novel feature of my machine is the manner in which I have mounted the handle 85 thereon. As is best seen in Figs. 3, 4 and 6 two curved levers 276 and 277 are pivotally attached by pins 279 and 280 to the yoke 91 of the handle 85. The front end portions of the levers 276 and 277 are attached to collars 282 and 283 by screws 284 and 285, respectively, the collars 282 and 283 being mounted in grooves or slots 286 and 287 in the clutch elements 191 and 190, respectively. The rear end portions of the two levers 276 and 277 cross over each other and extend on either side of an upstanding lug 288 secured to the tongue 88 of the handle 85 and extending upwardly through a slot 290 in the yoke 91.

With the above described novel connection of the handle 85 to the clutch elements 190 and 191 it will be seen that when the handle is in substantially straight alignment with the body of my machine, Fig. 3, the lug 288 is in mid-postion between the levers 276 and 277, and the clutch elements 190 and 191 are in operable engagement with the V-pulley 175 to be driven thereby. However, when my machine is being turned around a corner in the normal manner, side pressure is necessarily placed on the hand grip 86 of the handle 85 which thereby causes the tongue 88 to be pivoted upon the pin 93 and causes the lug 288 secured to the tongue 88 to engage the rear end of one or the other of the levers 276 and 277 to thereby cause that lever to pivot on its pin 279 or 280 and thereby move the corresponding clutch element 191 or 190 out of engagement with the V-pulley 175 so that the corresponding one of the wheels 44 or 51 is freed from being driven thereby. The wheel so disengaged is the wheel on the inside of the turn each time so that the outside wheel does the driving and the inside wheel is free to rotate an amount corresponding to the movement of my machine and therefore has no tendency to spin. Thus, for example, when turning my machine to the left in the normal manner, the operator applies pressure to the right on the hand grip 86 which thereby causes the tongue 88 to be pivoted on the pin 93 to the position shown in Fig. 6, in which position it will be noted that the lug 288 presses the rear end of the lever 277 outwardly to thereby rotate the lever 277 in a counter-clockwise direction, as viewed in Fig. 6, on the pin 280 and thus move the clutch element 190 out of engagement with the V-pulley 175 so that the left wheel 51, or, in other words, the wheel on the inside of the turn, is disengaged from the V-pulley 175 and is free to roll over the surface in accordance with the rate of travel of the outer wheel 44. Therefore, it will be seen that by my novel clutch connection of the wheels 44 and 51 to the V-pulley 275 my novel machine is enabled to turn corners in such a manner that the wheels tend to rotate at the proper rate throughout the turn.

In some instances it is desirable to stop the operation of a machine such as my novel machine without stopping the engine driving it, and for this purpose I have provided a novel linkage arrangement between the handle 85 and the clutch 105 whereby when the handle is in normal position the clutch 105 is "engaged" to drive my machine, and whereby, when desired, the clutch 105 may be "disengaged" to thereby stop the operation of my machine, by merely lifting up on the handle 85. For this purpose it will be noted that, as is best seen in Figs. 1, 3 and 4, the lower end portion of the lever 159, which has its upper end portion attached to the sleeve 157, is connected to one end of a link 292. The other end of the link 292 is connected to a lever 294 which extends upwardly from a collar 295 mounted on the bushing 99 on the shaft 35. The collar 295 is attached to the bushing 99 for rotation therewith by a suitable attaching means such as a screw 297, and the arm 96 of the handle 85 is likewise attached to the bushing 99 for rotation therewith by a screw 299. The arm 96 and the lever 294 are so positioned relative to each other around the bushing 99 that when the handle is in the normal low position it assumes during normal operation of my machine, the sleeve 157 is held thereby, through the linkage 294—292—159, in the position shown in Fig. 4, wherein the clutch 105 is "engaged" as previously described; and when the handle is raised by the operator this causes the arm 96 to be turned in a clockwise direction, as viewed in Fig. 1, to thereby similarly rotate the collar 295 and the lever 294 which, through the link 292 causes the lever 159 and, therefore, the sleeve 157 to be rotated in a counter-clockwise direction, as viewed in Fig. 1, so that the sleeve 157 is rotated into the position shown in Fig. 13 wherein the clutch 105 is disengaged as was also previously described. Thus it will be seen that the clutch 105 of my novel machine may be easily "engaged" and "disengaged" by the operator to thereby control the coupling of the wheels 44 and 51 and the mowing and plowing mechanism to the engine 101 while maintaining the engine in operation.

*Modified form of my machine shown in Figs. 14 and 15*

The modified form of my machine shown in Figs. 14 and 15 operates on the same principle as the preferred form of my machine shown in Figs. 1 to 13, inclusive, and like reference numerals have been used on like parts and the same reference numerals with the suffix "a" added thereto have been used on parts which are similar but have been substituted for parts of the preferred form of my invention. All the changes made in the modified form of my invention over the preferred form of my invention as shown are embodied in the rear portion of the machine and, more specifically, in the handle 85 and in the driving mechanism for the shafts 29 and 35.

The modified form of my machine shown in Figs. 14 and 15 is a manually operated combination snow-plow and lawn-mower as distinguished from a power driven machine as shown in Figs. 1 to 13. It will be noted that the changes made in the modified form of my machine comprise the following: The engine 101, the clutch 105, and the V-pulley 175 and associated mechanism have been eliminated and the wheels 44 and 51 are attached to a single shaft 29a by screws 310 and 311, respectively. The sprocket wheels 38 and 39 are likewise attached to the single shaft 29a instead of two separate shafts 29 and 35. The pivotal connection between the tongue and yoke of the handle used in guiding my machine has been eliminated and the tongue 88a of the new handle 85a is rigidly secured to the yoke 91a. Also, the yoke 91a is journaled on bushings 98a and 99a which are secured to the shaft 29a by means of screws 313 and 314.

In the operation of the modified form of my machine as shown in Figs. 14 and 15, the operator pushes and guides the machine by the handle 85a. When the machine is so pushed it moves along on the wheels 44 and 51, the rollers 67 and 68 and the wheels 59 and 60 in the same manner as the preferred form of my machine. Also the mowing and plowing operations of the modified form of my machine are performed in substantially the same manner as they are performed with the preferred form thereof, the primary difference being that in the modified form of my invention the rotary blade element 226 is driven by manual power instead of by the engine 101, the sprocket wheels 39 and 51 which drive the sprocket wheels 247 and 252, and, therefore, the rotary blade element 226, deriving their power from the rotation of the wheels 44 and 51 and the shaft 29a which results from the machine being pushed along by the operator.

From the foregoing it will be apparent that I have constructed a novel combination snow-plow and lawn-mower which is practical and is efficient in operation and may be economically manufactured commercially.

Also, it will be seen that I have afforded a novel machine wherein a master clutch may be readily operated in a novel and expeditious manner to engage the driving mechanism with the driven mechanism, and to disengage it therefrom.

Furthermore, I have provided a machine wherein the wheels on which my machine is transported, may be automatically and selectively disengaged from the power source, by which they are normally driven, to give optimum performance in turning corners.

Also, it will be noted that my machine discharges the material picked up thereby, in a controlled stream so that the material so discharged may either be caught in a suitable receptacle or may be piled on the ground in a suitable row.

In addition it will be seen that in my machine, the height of the cutter bar thereof with respect to the ground over which the machine is travelling, and the height of the rotary blade with respect to the cutter bar, may be readily adjusted in a novel and expeditious manner.

Hence, while I have illustrated and described the preferred embodiments of my invention, it is to be understood that these are capable of variation and modification and I therefore do not wish to be limited to the precise details set forth, but desire to avail myself of such changes and alterations as fall with the purview of the following claims.

I claim:

1. A machine of the character described comprising supporting means, means rotatably mounted on said supporting means for transporting said supporting means, driving means carried by said supporting means for rotating the transporting means, a rotary element carried by said supporting means connected to said transporting means for rotation therewith, and clutch means connected between said driving means and said transporting means for controlling the rotation of said transporting means and thereby the rotation of said rotary element, said clutch means comprising a pair of V-pulleys, each of said pulleys having two parts movable relative to each other to engage and disengage the clutch, and manually operable means for moving the parts of said V-pulleys relative to each other to thereby control the engagement and disengagement of said clutch.

2. In a machine of the character described and comprising supporting means, means rotatably mounted on said supporting means for transporting said supporting means, driving means carried by said supporting means for rotating the transporting means, a rotary element carried by said supporting means connected to said transporting means for rotation therewith, the combination of clutch means connected between said driving means and said transporting means for controlling the rotation of said transporting means and thereby the rotation of said rotary element, said clutch means comprising two V-pulleys operably connected to rotate with each other, each of said pulleys comprising two parts, one of said parts of each pulley being movable along the axis of rotation of said pulley relative to the other part, and means for controlling the engagement and disengagement of said clutch comprising a handle manually operable to control the position of said two parts of each of said pulleys relative to each other.

3. In a machine of the character described comprising supporting means, means rotatably mounted on said supporting means for transporting said supporting means, driving means carried by said supporting means for rotating the transporting means, a rotary element carried by said supporting means connected to said transporting means for rotation therewith, clutch means connected between said driving means and said transporting means for controlling the rotation of said transporting means and thereby the rotation of said rotary element, said clutch means comprising two V-pulleys operably connected to rotate with each other, each of said pulleys being divided into two parts transversely of the axis of rotation of said pulley, one of said parts of each of said pulleys being movable relative to the other of said parts to thereby control the engagement and disengagement of said clutch means, and means for controlling the movement of said movable parts comprising two sleeve members, each of said sleeve members being operable connected to one of said movable parts and having a cam surface opposed to the corresponding cam surface on the other sleeve member, and manually operable means for moving said cam surfaces relative to each other to thereby move said movable parts of said pulleys.

4. In a machine of the character described and comprising supporting means, means rotatably mounted on said supporting means for transporting said supporting means, driving means carried by said supporting means for rotating the transporting means, a rotary element carried by said supporting means connected to said transporting means for rotation therewith, clutch means connected between said driving means and said transporting means for controlling the rotation of said transporting means and thereby the rotation of said rotary element, said clutch means comprising two V-pulleys operably connected to rotate with each other, each of said pulleys being divided into two parts transversely of the axis of rotation of said pulley, one of said parts of each of said pulleys being movable relative to the other of said parts to thereby control the engagement and disengagement of said clutch means, and means for controlling the movement of said movable parts comprising a sleeve member slidably and non-rotatably mounted on said supporting means and connected to said movable part of one of said V-pulleys, a second sleeve member slidably and rotatably mounted on said supporting means and connected to said movable part of the other one of said V-pulleys, said sleeve members extending toward each other and having corresponding cams formed on their adjacent end portions, and manually operable means for rotating said second sleeve member relative to the first mentioned sleeve member to operably engage and disengage the corresponding cams on said sleeve members to thereby move said sleeve members and thereby said movable parts of said pulleys relative to each other.

5. A machine of the character described comprising supporting means, transporting means rotatably mounted on said supporting means and operable upon rotation to transport the machine across the surface on which it rests, a rotary element carried by said supporting means and connected to said transporting means for rotation therewith, a handle for turning the transporting means in two directions, and driving means for rotating said transporting means and thereby said rotary element, said driving means comprising power means, driven means connected to said power means for rotation thereby, coupling means connected to said transporting means and yieldingly engageable with said driven means to rotate said transporting means upon rotation of said driven means, and means connected to said handle and operable thereby for selectively controlling the engagement of said coupling means with said driven means to thereby selectively control the rotation of said transporting means.

6. A machine of the character described comprising supporting means, transporting means including two members rotatably mounted on said supporting means and operable upon rotation of said members to transport the machine across the surface on which it rests, a rotary element carried by said supporting means and connected to said two members for rotation therewith, a handle movably mounted on said supporting means for guiding the transporting means, said handle being movable in two directions relative to said supporting means, and driving means for rotating said members and thereby said rotary element, said driving means comprising a power source, driven means rotatably mounted between said two members and connected to said power source for rotation thereby, coupling means connected to said two members and yieldingly engageable with said driven means to rotate said two members upon rotation of said driven means, and means connected to said coupling means and said handle and operable upon movement of said handle in said directions to effect engagement of said coupling means with said driven means to thereby selectively control the rotation of said two members.

7. A machine of the character described comprising supporting means, transporting means including two members rotatably mounted on said supporting means and operable upon rotation of said members to transport the machine across the surface on which it rests, a rotary element carried by said supporting means and connected to said two members for rotation therewith, a handle for guiding the transporting means, and driving means for rotating said members and thereby said rotary element, said driving means comprising a power unit carried by said supporting means, a driven member rotatably mounted in said supporting means and operably connected to said power unit for rotation thereby, coupling members yieldingly engageable with said driven member for rotation thereby, said coupling members being connected to said first named two members to rotate said members, and means connected to and controlled by said handle for selectively controlling the engagement of said coupling members with said driven member to thereby control the rotation of said coupling members and said two members.

8. A machine of the character described comprising supporting means, transporting means for moving the machine, said transporting means including two axles journaled in said supporting means and two wheels, each of said wheels being mounted on a corresponding one of said axles for rotation therewith, a rotary element rotatably mounted in said supporting means and connected to said two wheels for rotation therewith, a handle for guiding the transporting means, and driving means for rotating said wheels and thereby said rotary element, said driving means comprising a power unit mounted on said supporting means, a pulley wheel journaled on said axles and connected to said power unit, two coupling members, each of said coupling members being slidably mounted on a corresponding one of said axles for rotation therewith, resilient members mounted on said axles and operable to urge said coupling members into frictional engagement with said pulley wheel for rotation thereby to thereby rotate said axles and said wheels, and means for selectively controlling the engagement of said coupling members with said pulley wheel, said last named means comprising levers connected to said handle and said coupling members and operable upon the application of lateral pressure on said handle in either direction to move the corresponding one of said coupling members out of engagement with said pulley wheel.

9. In a machine of the character described supporting means, transporting means connected to said supporting means for moving the machine, a rotary element rotatably carried by said supporting means and connected to said transporting means to be rotated thereby during normal movement of the machine, means for controlling the operation of said transporting means including a handle, said handle comprising two pivotally connected members, and means extending between said transporting means and one of said members and operable upon pivoting of said one member relative to the other of said members to vary the operation of said transporting means.

10. In a machine of the character described, supporting means, transporting means connected to said supporting means, said transporting means including a pair of axles and a pair of wheels for moving the machine, a rotary element rotatably mounted in said supporting means and connected to said axles to be rotated thereby during normal operational movement of the machine, a handle comprising one member connected to said axles and another member pivotally connected to said one member, and means engageable by said second member upon the application of predetermined lateral pressure thereto to vary the operation of said transporting means.

11. In a machine of the character described, supporting means, transporting means including a pair of axles journaled in said supporting means and a pair of wheels connected thereto for rotation therewith, driving means, coupling means for operably connecting said driving means to said axles and wheels to rotate said axles and wheels and thereby move the machine, a rotary element rotatably mounted in said supporting means and connected to said wheels to rotate therewith, a handle comprising one member connected to said axles and a second member pivotally connected to said one member, a plurality of levers pivotally connected to said one member and engaged with said coupling means, and means carried by said second member and operable to move said levers during pivotal movement of said second member relative to said one member to thereby selectively disconnect said coupling means from said driving means to thereby vary the operation of said wheels.

12. A machine of the character described comprising a supporting frame, a rotary element rotatably mounted on the supporting frame, means for transporting said supporting frame including two axles projecting from said frame and two wheels, each of said wheels being mounted on a corresponding one of said axles for rotation therewith, a V-pulley rotatably mounted on the inner ends of said axles, two coupling members, each of said coupling members being mounted on a corresponding one of said axles and engageable with a side wall of said V-pulley, each of said coupling members when engaged with said V-pulley being operable upon rotation of said pulley to rotate the corresponding axle and the wheel attached thereto, a motor mounted on the top wall of said supporting frame, a handle attached to said coupling members for guiding said supporting frame, means including a clutch for operably connecting said V-pulley to said motor, means connected to said handle and said clutch for disengaging said clutch upon movement of said handle in one direction and for engaging said clutch upon movement of said handle in another direction, means connected to said handle and operable upon the application of predetermined lateral pressure to said handle to disengage a corresponding one of said coupling members from said V-pulley, and means connecting said rotary element to said axles and operable upon rotation of either of said axles to rotate said rotary element.

13. A machine of the character described comprising a supporting frame, transporting members rotatably mounted on said frame for transporting the same through an operational movement, a rotary element rotatably mounted on said frame, a power unit mounted on said frame for rotating said transporting members and said rotary element, clutch means for connecting said power unit to said transporting members and said rotary element, said clutch means comprising two clutch units, one of said clutch units being operable to be engaged and disengaged to thereby operatively connect and disconnect said transporting members and rotary element, simultaneously, to, and from, said power unit, the other of said clutch units comprising control means selectively operable to be engaged and disengaged to thereby connect said control means to, and disconnect said control means from, predetermined ones of said transporting members, selectively, and a guide handle connected to said clutch means and movable in a plurality of directions, said handle being operable upon movement in predetermined ones of said directions to engage and disengage said one clutch unit to thereby connect and disconnect said transporting means and said rotary element, simultaneously, to and from said power unit, and said handle being operable upon movement in predetermined other ones of said directions to selectively engage and disengage said control means of said other clutch unit to thereby connect and disconnect said power unit to, and from, said transporting members, selectively.

14. In a machine of the character described adapted to pick up material such as grass or snow and discharge it in a controlled stream therefrom, a supporting frame including a forwardly facing transversely extending concave member, means rotatably mounted on the supporting frame for transporting the same, a pick-up member carried by the frame forwardly of said concave member and having a leading edge, a helical blade member rotatably mounted on the frame in the concavity of said concave member, said helical blade member upon rotation thereof acting to sweep material engaged by said pick-up member back from the leading edge of the latter between said concave member and the helical blade member, said frame being open at one side in alignment with the adjacent end of said helical blade member, and the helical member acting to discharge the material in a direction axially thereof through said opening, and means carried by the frame for driving said supporting means and said helical member.

15. In a machine of the character described adapted to pick up material such as grass or snow and discharge it in a controlled stream therefrom, a supporting frame having side walls and a concave front wall, means rotatably mounted on the supporting frame for transporting the same, a pick-up member carried by the frame in advance of said concave front wall and having a leading edge, a helical blade member rotatably mounted on the frame between the side walls thereof in the concavity of said front wall, one side wall of the frame having an opening therein in alignment with the adjacent end portion of the helical blade member, said helical blade member upon rotation thereof acting to sweep material engaged by said pick-up member back from the leading edge of the latter between said concave front wall and the helical blade member, and said helical blade member acting to discharge the material in a direction axially thereof through said opening in the side wall of the frame, and means carried by the frame for driving said supporting means and said helical blade member.

JOHN P. HEIL.

REFERENCES CITED

The following references are of record in the file of this patent:

UNITED STATES PATENTS

| Number | Name | Date |
|---|---|---|
| 382,388 | Ritchel | May 8, 1888 |
| 617,830 | Herran | Jan. 17, 1899 |
| 892,536 | Mitchell | July 7, 1908 |
| 1,170,877 | Colwell et al. | Feb. 8, 1916 |
| 1,468,977 | Schiesari | Sept. 25, 1923 |
| 1,819,133 | Stegeman et al. | Aug. 18, 1931 |
| 2,041,126 | George et al. | May 19, 1936 |
| 2,063,067 | Walter | Dec. 8, 1936 |
| 2,152,252 | Godwin et al. | Mar. 28, 1939 |
| 2,197,264 | Cooper | Apr. 16, 1940 |
| 2,200,623 | James | May 14, 1940 |
| 2,453,819 | Smith | Nov. 16, 1948 |